United States Patent Office 3,697,253
Patented Oct. 10, 1972

3,697,253
PLANT GROWTH REGULATION
Robert R. MacMurray, 21 Colonial Ave.,
Haddonfield, N.J. 08033
No Drawing. Filed Apr. 11, 1969, Ser. No. 815,493
Int. Cl. A01n 9/00, 9/24
U.S. Cl. 71—97                             22 Claims

ABSTRACT OF THE DISCLOSURE

Plant growth regulant compounds and compositions, particularly stimulants, containing N,N-di-n-propyl-4-trifluoromethyl-2,6-dinitroaniline generically named trifluralin or cacodylic acid and its salts or combinations thereof with each other and with 2,4-dichlorophenoxyacetic acid and/or 2,4,5-trichlorophenoxyacetic acid and methods of using these compounds and compositions to stimulate plant growth and stimulate and increase crop yield and adjust fruiting time.

---

This invention relates to plant growth regulating compounds, compositions, particularly growth stimulants and method of stimulating growth and of stimulating and increasing crop yield.

Another object of the invention is to provide growth stimulating compositions containing N,N-di-n-propyl-4-trifluoromethyl-2,6-dinitroaniline, having the generic name trifluralin as the active ingredient.

Another object of the invention is to provide growth stimulating compositions containing cacodylic acid or a salt thereof as the active ingredient.

Another object of the invention is to provide growth stimulating compositions containing a combination of trifluralin and cacodylic acid or a salt thereof as the active component.

Another object of the invention is to provide growth stimulating compositions containing trifluralin and/or cacodylic acid or a salt thereof in combination with 2,4-dichlorophenoxyacetic acid and/or 2,4,5-trichlorophenoxyacetic acid or salts thereof.

A further object of the invention is to provide compositions and method of stimulating the growth of herbaceous and/or woody stemmed plants, annuals and perennials, which is of economic importance in that the invention can intensify the annual growth of plants, thus hastening their development to marketable or useable size, as in nursery, shrubbery or tree farms, can also increase the crop yield, i.e. the weight or number of fruit, and can favorably adjust the fruiting time.

These and other objects of the invention will become more apparent as the following description proceeds.

The invention is based on the discovery that certain herbicidal compounds, alone or in combination with each other provide effective plant growth stimulation when applied thereto in sublethal doses. These compounds are N,N - di - n - propyl-4-trifluoromethyl-2,6-dinitroaniline, known generically as trifluralin, and herbicidal to germinating and seedling weed grasses as described in U.S. Pat. 3,257,190 and hereinafter called compound A; cacodylic acid and particularly the sodium salts thereof, as described in U.S. Pat. 3,056,668 and hereinafter referred to as compound B; 2,4-dichlorophenoxyacetic acid known generally as 2,4-D and the sodium salt thereof and hereinafter called compound C; and 2,4,5-trichlorophenoxyacetic acid known generally as 2,4,5-T and the sodium salt thereof and hereinafter called compound D.

These compounds and compositions thereof are preferably formulated for use in emulsifiable concentrates, although they may be used as aqueous dispersions. They may also be prepared as wettable powders for sprays, as granules or as dispersions on carriers such as peat moss or vermiculite as is well-known in the art.

It is preferred that the compounds or compositions be applied to woody stemmed plants after they have achieved their normal spring growth, but not so late in the summer that the newly induced growth would suffer from winter. With regard to herbaceous and crop bearing plants, it is preferred that the compounds or compositions be applied prior to the development of either buds or fruit.

To achieve growth or crop stimulation, the compounds or compositions are distributed over the area to be treated in a suitable formulation by methods well-known to the art, at the following rates:

A—at rates of from 0.5 gram to 100.00 grams per acre;
B—at rates of from 0.3 gram to 4.0 grams per acre;
C—at rates of from 0.17 gram to 124.0 grams per acre;
D—at rates of from 0.08 gram to 63.0 grams per acre.

The rates are additive for combinations of the compounds.

To achieve plant growth and crop increase, I prefer to use the following rates of application:

A—0.8 gram to 8.0 grams per acre;
B—0.3 gram to 4.0 grams per acre;
C—0.17 gram to 0.78 grams per acre;
D—0.08 gram to 0.39 grams per acre.

Here again the rates are additive for combinations of the compounds.

These preferred rates of application are based upon the following examples, and are not to be deemed limitative since older and larger plants than those used may require larger rates of application. Further, if the compounds or compositions are applied through the soil, heavier concentrations may be necessary, for such application is less direct than is spraying upon leaves and stems. Plants upon which tests were carried out were Tiny Tim tomatoes, Dwarf peas, radishes, fern arbor vitae, Japanese holly, Russian olive, American holly, bush roses and climbing roses, as well as yew shrubs.

The following examples are non-limitative illustrations of the invention and the results obtained thereby.

EXAMPLE 1

Upon four yews which had accomplished their spring growth and had already turned dark green was sprayed an aqueous solution containing 5.0 cc./gal. of a concentrate comprising, by weight, 1.56% A (trifluralin), 4.58% B (the disodium salt of cacodylic acid), 1.14% C. (the sodium salt of 2,4-dichlorophenoxyacetic acid and acid), inert ingredients 92.16%, which concentrate is 0.56% D (the sodium salt of 2,4,5-trichlorophenoxyacetic sold commercially as Greenfield broadleaf weed and crabgrass killer, a product of Eli Lilly and Company. Within 10 days, the yews were covered with new growth, bright yellow green in color, up to 1 inch in length. At the same time, other yews exhibited only the occasional new shoots common to yews over the summer. The newly induced growth on the yews reached up to 10 inches in length within 2 months with normal feeding and no further application of the spray. The shrubs wintered very well and exhibited normal growth during the spring.

The same aqueous herbicidal solution was also sprayed to drip off on a variety of other woody stemmed perennials in mid-June 1967 with the same dosage as had been used on the yews. This variety of plants included a small American holly bush, 15 rose bushes and climbers, and 14 Russian olive plants. These plants were all at least 2 years old, and one of the climbing roses was at least 13 years old at the time.

The holly bush had already accomplished its typical 3 to 4 inches of annual growth when it was sprayed in mid-June of 1967. By July 15, it had produced another 6 inches of new growth, and by mid-fall of 1967, had produced a total new growth for the year of 23 inches. Thus 19 inches of that total growth followed spraying.

A Peace Rose bush, long established when sprayed in mid-June 1967, had typically put forth 3 to 5 new shoots per year over the previous several years. At the time of spraying, it was about 4 feet high, 3 feet across at the crown, and had produced 4 new shoots. After being sprayed, it put forth 10 new shoots, up to 34 inches in length, 2 of which, by July 15, 1967, had developed 4 and 6 branches. All of the new shoots were in bud on July 15.

The 13 years old climbing rose, on a 6 foot trellis had several new shoots of 2 to 5 feet in length by mid-June 1967. Following spray to drip off, by July 15, 1967 its earlier shoots had grown more than 3 additional feet in length, and the plant had put forth 5 new shoots.

The Russian Olive plants had been planted in May of 1966, being, at that time, well rooted 2 year old plants. In the summer of 1966 they grew about 8 to 10 inches. Until mid-June of 1967 they had grown another 10–14 inches of new growth. That new growth, which is at first covered with a velvety light green bark, had already begun to darken and harden when 14 of the plants were sprayed in mid-June of 1967. By July 15, those original new shoots had grown up to an additional 20 inches and had put forth branching shoots of up to 15 inches. Further, new leaf buds had burst forth all over the plants and new shoots had started from near their roots.

Meanwhile, the untreated olives had settled down with their 10–14 inches of new growth which had substantially ended by early June. By late summer of 1967, the treated olive shrubs had reached total height of over 5 feet while the untreated where only 3 feet high. By June 30, 1968 the treated shrubs had reached 7 feet in height, while the untreated ran between 2½ to 4 feet in height.

These results were obtained using a single spray solution, 5.0 cc. to the gallon of water, of the aforementioned concentrate showing that a sublethal dose of the aforesaid combination of herbicides generates extraordinary growth.

EXAMPLE 2

Tiny Tim tomato plants in 15 groups of 4 plants each and a control group of 4 plants, were sprayed and planted on August 27. The plants were about 11 weeks old at that time, but were not very large, having been in small trays. Some of them were in bud and flower, and a few had already formed fruit.

These plants were sprayed with compound and composition sprays made up from individual aqueous stock solutions containing the herbicidal compounds in the following strengths, by weight, using NaOH to solubilize C and D:

|   | Percent |
|---|---|
| A—Trifluralin | 1.56 |
| B—Sodium cacodylate | 4.58 |
| C—2,4-D | 1.14 |
| D—2,4,5-T | 0.56 |

The spray solutions were prepared by diluting the individual stock solutions with plain water at a rate of 5.0 cc. per gallon. The resulting spray solutions contained the herbicidal compounds in approximately the following parts per million:

A=20.0 p.p.m.
B=61.0 p.p.m.
C=15.0 p.p.m.
D=7.0 p.p.m.
ABC=96.0 p.p.m.
ABD=88.0 p.p.m.
CAD=42.0 p.p.m.

Changes in height and stem thickening were observed. Those plants sprayed with the solution containing the compounds A, B and D showed a vertical growth about 20% in excess of the control group which was not sprayed with the test solutions but was fed with the same nutrients as the test plants.

The plants treated with the same group ABD showed, after 6 days, a moderate thickening at the upper part of the plant, at and above the lowest branches and heavy convolutions and stem looping as compared to only slight thickening at the upper part of the plant at and above the lowest branches and no convolute growth. After 13 days they showed heavy stem thickening at the upper part of the plant at and above the lowest branches and moderate convolute growth.

The plants treated with group ABC showed, after 6 days as well as after 13 days, moderate stem thickening at the upper part of the plant at and above the lowest branches and moderate convolute growth. The plants treated with group CAD showed, after 6 days, slight stem thickening at the upper part of the plant at and above its lowest branches and moderate convolute growth and after 13 days the same locus and degree of convolution was observed but the stem thickening was moderate.

In later days, it was observed that the stem thickening locus changed, moving down the main stem of the plant below the lower branches. In all cases, where stem thickening took place, it occurred initially at the juncture of branches with the main stem.

Because Fall was setting in, and certain experimental groups were bearing buds, flowers and fruit quite heavily as compared to the control group, certain plants were potted and installed in a greenhouse.

In all, ten plants were placed in the greenhouse on Oct. 23, 1967. They were as follows:

Control Group 1, plant #1
Control Group 2, plant #2
Group A, plants #3 and 4
Group B, plant #4
Group C, plant #1
Group D, plant #1
Group ABD, plant #3
Group CAD, plants #1 and 2.

Since space was limited, the plants in group ABC were not placed in the greenhouse although they had shown a remarkable growth in physical size.

In the greenhouse I observed the budding, flowering and fruiting effects of the compounds and compositions. The results are summarized in Tables 1, 2, 3 and 4.

Table 1 shows the number of buds and flowers counted on the several dates recorded. There is no totalling because the buds and flowers will turn to fruit in Table 2 and be totalled as ripe fruit harvested in Table 3.

TABLE 1.—AVERAGE NO. OF BUDS AND FLOWERS PER PLANT, AT EACH COUNT (ROUNDED) OVER THE PERIOD 10/23/67 TO 12/17/67, AND TO 2/10/68, INDEXED TO CONTROL COUNT FOR EACH PERIOD

|  | To 12/17/67 | Index | Group average where pertinent | To 2/10/68 | Index | Group average where pertinent |
|---|---|---|---|---|---|---|
| Control | 61 | 1.00 |  | 68 | 1.00 |  |
| A plant | 45 / 54 | 0.74 / 0.88 | 0.81 | 67 / 91 | 0.99 / 1.34 | 1.18 |
| B plant | 100 | 1.64 |  | 73 | 1.07 |  |
| C plant | 128 | 2.10 |  | 97 | 1.43 |  |
| D plant | 75 | 1.23 |  | 55 | 0.81 |  |
| ABD plant | 141 | 2.31 |  | 80 | 1.18 |  |
| CAD plant | 139 / 162 | 2.28 / 2.66 | 2.47 | 87 / 95 | 1.28 / 1.40 | 1.34 |

TABLE 2.—AVERAGE NO. OF FRUIT FORMED PER PLANT (ROUNDED) AT EACH COUNT TAKEN OVER THE PERIODS 10/23/67 TO 12/17/67 AND TO 2/10/68 INDEXED TO CONTROL FOR EACH PERIOD, ROUNDED

|  | To 12/17/67 | Index | Group average where pertinent | To 2/10/68 | Index | Group average where pertinent |
|---|---|---|---|---|---|---|
| Control plant | 29 | 1.00 |  | 23 | 1.00 |  |
| A plant | 27 / 21 | 0.93 / 0.73 | 0.83 | 18 / 14 | 0.78 / 0.61 | 0.70 |
| B plant | 26 | 0.90 |  | 24 | 1.04 |  |
| C plant | 26 | 0.90 |  | 29 | 1.26 |  |
| D plant | 38 | 1.31 |  | 41 | 1.79 |  |
| ABD plant | 65 | 2.24 |  | 53 | 2.30 |  |
| CAD plant | 57 / 64 | 1.96 / 2.21 | 2.09 | 67 / 54 | 2.91 / 2.34 | 2.63 |

TABLE 3.—AVERAGE NO. RIPE FRUIT PICKED PER PLANT (ROUNDED) AT EACH HARVEST DATE VER THE PERIODS 10/23/67 TO 12/17/67 AND TO 2/10/68 INDEXED TO CONTROL FOR EACH PERIOD, ROUNDED

|  | To 12/17/67 | Index | Group average where pertinent | To 2/10/68 | Index | Group average where pertinent |
|---|---|---|---|---|---|---|
| Control plant | 2.1 | 1.00 |  | 1.4 | 1.00 |  |
| A plant | 2.8 / 2.7 | 1.33 / 1.28 | 1.31 | 1.7 / 1.6 | 1.21 / 1.14 | 1.18 |
| B plant | 1.7 | 0.80 |  | 2.2 | 1.57 |  |
| C plant | 1.7 | 0.80 |  | 2.8 | 2.00 |  |
| D plant | 1.6 | 0.76 |  | 2.5 | 1.78 |  |
| ABD plant | 3.3 | 1.57 |  | 2.5 | 1.78 |  |
| CAD plant | 3.1 / 4.0 | 1.47 / 1.90 | 1.68 | 4.6 / 3.7 | 3.28 / 2.64 | 2.96 |

Tables 1 and 2 demonstrate the crop stimulant properties of the several compounds and compositions as follows.

In Table 1, compound A, trifluralin, exerts an initially retardative effect on budding and flowering producing only 81% of those produced by the control plant as of 12/17/67, but rises to a group average index, (for both plants) of 1.18, or, 18% greater than the control performance as of 2/10/68. Despite the initial retarding, plants treated with trifluralin, outproduced the control plants over the entire time period.

The plant treated with compound B also outproduced the control plant. Timing differs, however, from that of compound A. Compound B produced a 64% increase (indexed to control as 1.64) over control as of 12/17/68, falling overall to a 7% increase as of 2/10/68. Thus compound B works its major effect in the earlier period.

Compounds C and D also work their greatest effect in the earlier period, that is, by 12/17/67. The plant treated with compound C outproduces the control plant at both dates, while that treated with compound D outproduces the control plant at 12/17/67 only.

The plant treated with composition ABD exhibits unusual stimulation, having an index of 2.31 (231%) to the control plant as of 12/17/67, falling to 1.18 overall, as of 2/10/68, producing only 18% more buds and flowers overall than did the control plant.

The plants treated with composition CAD exceed the control yield through 12/17/67, having a group average index (average of both plants) of 2.47 at that date, but afterwards falling to an all inclusive group average index of 1.34 on 2/10/68.

In light of later experimental experience, it can be seen that these plants were dosed too strongly, which may account for the relatively poor showing overall as compared to 12/17/67.

Further, while this is a relatively weak experiment because of the necessity to use so many single plants, instead of groups of two, three or more plants, it is still valuable, for it does indicate that the compositions tend to exceed the compounds in stimulating production of buds and flowers, and it also gives evidence of positive synergy.

The positive synergic behavior of the compounds when combined into the compositions is illustrated in Tables 1–A and 1–B.

TABLE 1–A

Synergy indicated in Table 1, as of 12/17/67, by comparison of additive average percent difference from control production of buds and flowers, and compositional percentage differences from control By compounds, percent:         by compositions, percent A, B and D=68 _____ ABD=131
A, C and D=114 _____ CAD=147

TABLE 1–B

Synergy indicated in Table 1, as of 2/10/68, by comparison of additive average percent difference from control production of buds and flowers, and compositional percentage differences from control By compounds, percent:         By compositions, percent
A, B and D=6 _____ ABD=18
A, C and D=42 _____ CAD=34

It is manifest that the compositions are more potent in achieving growth stimulation than are the individual compounds. It is also worth noting that compound A, trifluralin, compound B, sodium cacodylate, and compound D, 2,4,5–T., all induce budding and flowering performance in significant excess of that exhibited by the control plant, as does compound C, 2,4–D.

Similar interpretation can be made of Table 2, and much the same conclusions as to positive synergy can be drawn from the data in Table 2, as exhibited in Tables 2–A and 2–B below.

TABLE 2–A

Synergy indicated in Table 2, as of 12/17/67, by comparison of additive average percent difference from control fruit forming, and compositional percentage differences from control By compounds, percent:         By compositions, percent
A, B and D=4 _____ ABD=124
A, C and D=4 _____ CAD=109

TABLE 2–B

Synergy indicated in Table 2, as of 2/10/68, by comparison of additive average percent difference from control fruit forming, and compositional percentage differences from control By compounds, percent:         By compositions, percent
A, B and D=53 _____ ABD=130
A, C and D=75 _____ CAD=163

Turning now to Table 3, which simply indexes the total ripe fruit picked per spray group to that picked from the control group, it is instructive to note that the trifluralin (compound A) shows an early ripening effect. As a result, plants sprayed with trifluralin exhibit a 31% increase in ripe fruit over the control in the period 10/23/67 to 12/17/67.

Positive synergy in Table 3 is demonstrated in Table 3–A below.

TABLE 3-A

Synergy indicated in Table 3 as of 12/17/67, by comparison of compounds' additive percentage differences from control production of ripe fruit, and compositional percentage differences from control

| By compounds, percent: | By compositions, percent |
|---|---|
| A, B and D=−13 | ABD=57 |
| A, C and D=−13 | CAD=68 |

Table 3-A clearly indicates a synergic relation between the compounds in the compositions, a relation which accomplishes a positive and significant harvest effect.

TABLE 4-A.—TOTAL GRAM WEIGHT OF RIPE FRUIT HARVESTED (ROUNDED) PER PLANT, 12/17/68 TO 2/10/68 INDEXED (ROUNDED) TO GRAM WEIGHT OF CONTROL PLANT. ALSO, SIZE RANGE OF FRUIT HARVESTED

| | Total gram weight | Total gram weight indexed to control | Group average where pertinent | Size range |
|---|---|---|---|---|
| Control plant | 9 | 1.00 | | 9 to 13/16. |
| A plant | 6 | 0.67 | 0.72 | 10 to 11/16. |
|  | 7 | 0.77 | | 11 to 12/16. |
| B plant | 116 | 21.88 | | 7 to 14/16. |
| C plant | 95 | 10.55 | | 8 to 12/16. |
| D plant | 96 | 10.66 | | 8 to 13/16. |
| ABD plant | 96 | 10.66 | | 9 to 14/16. |
| CAD plant | 171 | 19.00 | 14.72 | 7 to 14/16. |
|  | 94 | 10.44 | | 8 to 13/16. |

TABLE 4-B.—ESTIMATED AND RECORDED GRAM WEIGHTS INDEXED TO ESTIMATED CONTROL WEIGHT

| | Total gram weight | Total gram weight indexed to estimated control | Group average of total gram weight where pertinent |
|---|---|---|---|
| Control plant | 44 | 1.00 | |
| A plant | 56 | 1.27 | 1.35 |
|  | 63 | 1.43 | |
| B plant | ¹116 | 2.64 | |
| C plant | ¹95 | 2.16 | |
| D plant | ¹96 | 2.18 | |
| ABD plant | ¹96 | 2.18 | |
| CAD plant | ¹171 | 3.89 | 3.02 |
|  | ¹94 | 2.14 | |

¹ Recorded weight.

Table 4-A relates to the effect of the sprays of the gram weight of ripe fruit harvested as well as their size range. As a result of beginning to weight ripe fruit only on 12/17/68, the control group and group A are understated. This can be offset by a reasonable estimate of what those two groups would have yielded if their production of unrecorded ripe fruit weight prior to 12/17, in grams, were proportional to the gram weight of their recorded production. This is presented in Table 4-B.

The control group has five fruit weighed and recorded (Table 4-A) for a gram weight of 9. Prior to recording gram weight, it has produced 19 ripe fruit. If each of the unweighed 19 were equivalent to the weighed 5, total gram weight of the 5 and the 19 can be estimated to be 44 grams. Similar calculations produce estimates for the two group A plants of 56 and 63 grams, respectively.

Recalculation then of the indices in Table 4-A give the more reliable indices of Table 4-B. The data of Tables 4-A and B show that every experimental spray group outperforms the control by substantial margins.

EXAMPLE 3

In this experiment, two types of woody stemmed perennials were used to demonstrate the growth stimulating effects of the compounds and compositions listed below. The two types of plants were Fern Arbor Vitae and Japanese Holly. Two separate batches of the arbor vitae were used, 15 experimental groups and one control group (2 plants per group) for a total of 16 groups per batch. One batch was fed frequently, and the other was fed only once. One batch of Japanese Holly was used comprising the same 16 groups, 15 experimental and one control.

The plants were sprayed with sprays made up from aqueous stock solutions containing the following percentage by weight of the following compounds:

| | Percent |
|---|---|
| A—Trifluralin | 1.40 |
| B—Cacodylic acid | 4.60 |
| C—2,4-D | 1.04 |
| D—2,4,5-T | 0.52 |

These stock solutions were diluted with plain water at a rate of 5.0 cc. per gallon, yielding spray solutions of approximate parts per million as follows:

| Spray solution | P.p.m. | Spray solution | P.p.m. | Spray solution | P.p.m. |
|---|---|---|---|---|---|
| A | 18.0 | AC | 32.0 | ABC | 94.0 |
| B | 61.0 | AD | 25.0 | ABD | 87.0 |
| C | 14.0 | BC | 76.0 | BCD | 82.0 |
| D | 7.0 | BD | 68.0 | CAD | 39.0 |
| AB | 80.0 | CD | 21.0 | ABCD | 101.0 |

These plants, all two year old well-rooted cuttings, had been placed in a greenhouse in September of 1967 to prevent their going dormant. They had finished their summer's growth at that time.

On Dec. 2, 1967, the plants were sprayed to drip-off (on needles and leaves) in experimental groups of two plants each. Each plant was appropriately labeled indelibly marked to identify the plant as to batch, group and number (one or two).

To avoid contamination, the sprayers were thoroughly washed and rinsed following each use by washing them in a warm detergent solution if the spray had contained trifluralin; otherwise they were washed in clear warm water. In either event, after washing, they were rinsed seven times in fresh clear warm water.

Having sprayed the plants outdoors to drip-off, 6 at a time (2 Batch 1 Fern arbor vitae, 2 Batch 2 Fern arbor vitae and 2 Batch 1 Japanese Holly) by each experimental spray, the plants were placed on tables in the greenhouse in clusters of 6 in such a way that no one cluster could drip upon another, nor could subsequent waterings cause contamination until the sprays had been absorbed. Having been well watered the day before spraying, they were then not watered for 5 days to give plenty of time for absorption.

On Dec. 3, 1967 the height of each pot was measured and the height of each plant, free standing, above its pot rim. Measurements were made every week after Dec. 16 up through Apr. 6, 1968, taking a total height measure of pot plus plant.

On Jan. 3, 1968 a monthly measurement was made in which the plant was straightened vertically above its base, and the height of its main stem tip above its pot rim was measured.

This new measurement required that the height of the main stem tip above its pot rim as of Dec. 2, 1967, the day of spraying be estimated. This was accomplished as follows: What new growth had occurred in the meantime was easily identified by its color, measured, and that measure subtracted from the Jan. 3, 1968 measure of plant height straightened above pot rim to determine the plant's height straightened above the pot rim as of Dec. 2, 1967. That estimated measure served as a base against which to index the growth of the individual plants and groups of two plants.

This was done on January 3 for both batches of Fern Arbor Vitae and on Jan. 5, 1968 for the Japanese Holly.

Both the batch of Fern Arbor Vitae called Batch 1 and the Japanese Holly batch were fed 4 times in the course of this experiment, while Batch 2 of the Fern Arbor Vitae was fed only once. The feedings consisted of about 4 ounces of a 30-10-10 fertilizer, dissolved at a rate of 1 tablespoon per gallon of water.

My Mar. 16, 1968, most of the plants in Fern Arbor Vitae Batch 2 showed pronounced signs of starvation, being, at the least, browned at the tips if not actually in the process of dying. That batch was then fed a second time, to prolong their life as long as possible. Many of them recovered, but their growth performance was poor relative to Fern Arbor Vitae Batch 1.

The only instances of browning which occurred in Fern Arbor Vitae Batch 1 were the two plants sprayed with solution ABCD, which was noted on 12/30/67, and in one plant sprayed with solution CAD, noted on 5/4/68.

In the tables concerning these plants, plants sprayed with Compound A (trifluralin) are called Group A, etc. Tables 5, 6 and 7 summarize the growth regulating effects of the various compounds and compositions.

Tables 5-B, 6-B and 7-B are less instructive than Tables 5-A, 6-A and 7-A, because they reflect the effects of both helio- and geo-tropism but they provide a comparison to the more valid Tables 5-A, 6-A and 7-A.

TABLE 5.—FERN ARBOR VITAE, BATCH 1, INDEX OF GROWTH STIMULATION, AVERAGE OF SPRAY GROUPS, 5/4/68 INDEXED TO AVERAGE OF 12/2/67

|  | 5-A | | | 5-B | | |
|---|---|---|---|---|---|---|
|  | Main stem tip straightened above pot | | | Free standing plant height, subject to both helio- and geo-tropism | | |
|  | Index | Stim. exceeds control | Index of excess | Index | Stim. exceeds control | Index of excess |
| Control | 1.26 |  |  | 1.20 |  |  |
| Group: |  |  |  |  |  |  |
| A | 1.24 |  | (0.92) | 1.17 |  | (0.85) |
| B | 1.58 | X | 2.23 | 1.23 | X | 1.15 |
| C | 1.36 | X | 1.39 | 1.22 | X | 1.10 |
| D | 1.81 | X | 3.12 | 1.41 | X | 2.05 |
| AB | 1.23 |  | (0.88) | 1.26 | X | 1.30 |
| AC | 1.57 | X | 2.19 | 1.27 | X | 1.35 |
| AD | 1.28 | X | 1.08 | 1.21 | X | 1.05 |
| BC | 1.23 |  | (0.88) | 1.25 | X | 1.25 |
| BD | 1.28 | X | 1.08 | 1.13 |  | (0.65) |
| CD | 1.66 | X | 2.54 | 1.38 | X | 1.90 |
| ABC | 1.93 | X | 3.58 | 1.47 | X | 2.35 |
| ABD | 1.70 | X | 2.69 | 1.30 | X | 1.50 |
| BCD | 1.68 | X | 2.62 | 1.48 | X | 2.40 |
| CAD | 1.51 | X | 1.96 | 1.25 | X | 1.25 |
| ABCD | 1.21 |  | (0.81) | 1.09 |  | (0.45) |

In Tables 5, 6 and 7, the column captioned "Index" shows an index calculated by averaging the growth of the two plants in each spray group on the final observation date, which is then indexed to the average of the two plants' height on date of spraying. The column captioned "Index Of Excess" shows how much growth a given spray group produced, indexed to the growth of the control group as of the final observation date. It is calculated by taking, for example, the 58% growth over control (from the index column) for group B in Table 5-A, and dividing it by the 26% growth exhibited by the control group in Table 5-A. It is observed that Group B developed 223% as much growth as did the control group, which indexes to 2.23.

Some entries in the Index of Excess column are put in parentheses, because they indicate either an index of 1.00 or less, which means that their respective plants grew just in proportion to the control group, or less than proportionally.

Table 5-A shows that three herbicidal compounds and eight compositions produced growth in excess of the control group, of from 1.08 (8%) to 3.58 (258%) more than the control. Most noteworthy is that two of the compounds (B and D) and five of the compositions (AC, CD, ABC, ABD and BCD) produced more than twice as much growth as did the control group. A sixth composition, CAD, very nearly, and to all practical purposes, doubled the control groups' growth.

TABLE 6.—FERN ARBOR VITAE BATCH 2, INDEX OF GROWTH STIMULATION, AVERAGE OF SPRAY GROUPS, 5/4/68 INDEXED TO AVERAGE OF 12/2/67

|  | 6-A | | | 6-B | | |
|---|---|---|---|---|---|---|
|  | Main stem tip straightened above pot rim | | | Free standing pot and plant height, subject to both helio- and geo-tropism | | |
|  | Index | Exceeds control | Index of excess | Index | Exceeds control | Index of excess |
| Control | 1.26 |  |  | 1.20 |  |  |
| Group: |  |  |  |  |  |  |
| A | 1.37 | X | 1.42 | 1.19 |  | (0.95) |
| B | 1.31 | X | 1.19 | 1.17 |  | (0.85) |
| C | 1.11 |  | (0.42) | 1.14 |  | (0.70) |
| D | 1.59 | X | 2.27 | 1.13 |  | (0.65) |
| AB | 1.46 | X | 1.77 | 1.27 | X | 1.35 |
| AC | Dead |  |  | Dead |  |  |
| AD | 1.04 |  | (0.15) | 1.06 |  | (0.30) |
| BC | Dead |  |  | Dead |  |  |
| BD | 1.88 | X | 3.39 | 1.53 | X | 2.04 |
| CD | 1.12 |  | (0.46) | 1.20 |  | (1.00) |
| ABC | Dead |  |  | Dead |  |  |
| ABD | Dead |  |  | Dead |  |  |
| BCD | 1.30 | X | 1.15 | 1.03 |  | (0.15) |
| CAD | 1.32 | X | 1.23 | 1.22 | X | 1.10 |
| ABCD | Dead |  |  | Dead |  |  |

It was necessary to use the Fern Arbor Vitae Batch 1 control in constructing the foregoing Tables 6-A and B, because the Batch 2 control plants died after six weeks. Rather than use only 6 weeks observations for Tables 6-A and B, it was preferable to substitute the Batch 1 controls, even though that substitution does understate the growth performance of the experimental plants in Batch 2 because the Batch 1 controls were fed more frequently.

Table 6-A shows that four compounds and three compositions induce growth in excess of that produced by the control.

TABLE 7.—JAPANESE HOLLY, INDEX OF GROWTH STIMULATION, AVERAGE OF SPRAY GROUPS, 4/4/68* INDEXED TO AVERAGE OF 12/2/67

|  | 6-A | | | 6-B | | |
|---|---|---|---|---|---|---|
|  | Main stem tip straightened above pot rim | | | Free standing pot and plant height, subject to both helio- and geo-tropism | | |
|  | Index | Exceeds control | Index of excess | Index | Exceeds control | Index of excess |
| Control | 1.11 |  |  | 1.06 |  |  |
| Group: |  |  |  |  |  |  |
| A | 1.30 | X | 2.73 | 1.18 | X | 3.0 |
| B | 1.10 |  | (0.90) | 1.09 | X | 1.5 |
| C | 1.15 | X | 1.36 | 1.10 |  | (0.17) |
| D | 1.09 |  | (0.82) | 1.02 |  | (0.33) |
| AB | 1.11 |  | (1.00) | 1.04 |  | (0.67) |
| AC | 1.27 | X | 2.46 | 1.10 | X | 1.67 |
| AD | 1.10 |  | (0.90) | 1.05 |  | (0.83) |
| BC | 1.08 |  | (0.73) | 1.05 |  | (0.83) |
| BD | 1.10 |  | (0.90) | 1.06 |  | (1.00) |
| CD | 1.16 | X | 1.46 | 1.06 |  | (1.00) |
| ABC | 1.16 | X | 1.46 | 1.08 | X | 1.33 |
| ABD | 1.11 |  | (1.00) | 1.04 |  | (0.67) |
| BCD | 1.07 |  | (0.64) | 1.01 |  | (0.17) |
| CAD | 1.08 |  | (0.73) | 1.01 |  | (0.17) |
| ABCD | 1.05 |  | (0.64) | 1.02 |  | (0.33) |

*Control died before 5/4/68. Therefore 4/4/68 is used as end date.

Table 7-A shows that two compounds and three compositions are capable of inducing height growth in excess of normal, as exemplified by the control plants.

It should be noted that the Japanese Holly reacted to the experimental sprays in a manner different from the Fern Arbor Vitae, but, as found out later, consistent with its own normal growth pattern. While the Fern Arbor Vitae exhibited growth that was chiefly linear along its main stems and branches, the holly exhibited not only some linear growth but also put forth, in varying profusion, new shoots from the base of the plant as well as from the stem and lesser branches, thus producing a bushier shrub. In both cases, Fern Arbor Vitae and Japanese Holly, the artificially induced growth followed the natural growth pattern. For example, compound B produced a new shoot on one of the Japanese Holly plants, growing from the plant's base, of 4.75 inches in length, and compound C, a similar shoot, of 5.25 inches in length.

The next four examples, 4 through 7, all originate in a single large experiment carried out through the spring, summer and early fall of 1968. The examples are more easily understood when presented singly. In all of these examples, neither sodium cacodylate nor cacodylic acid (the compounds denoted B in earlier experiments) were used. In every instance, stock solutions were prepared by dispersing the active ingredients in Tween #20, although any other non-ionic wetting or emulsifying agent could be used.

EXAMPLE 4

Tiny Tim tomatoes and dwarf peas were used which had been started from seed in 3 inch peat pots (3 seeds per pot) 6 and 4 weeks, respectively, earlier. On April 21 they were sprayed with experimental sprays made up at the rate of 100 cc. stock solution per gallon of water. Specifically, using 10 cc. graduated syringes, the stock solutions were diluted to spray solutions by adding 12.5 cc. of the appropriate stock solution or solutions to one pint of water. I obtained the following spray solutions:

| Spray solution | Active ingredient in stock solution by weight, percent | Cc. of stock solution per pint of water | Approximate active ingredient in spray solution, p.p.m. (rounded) |
|---|---|---|---|
| A—Trifluralin | 1.48 | 12.5 | 440.0 |
| C—2,4-D | 0.50 | 12.5 | 145.0 |
| D—2,4,5-T | 0.25 | 12.5 | 78.0 |
| AC—As above | As above | 25.0 | 585.0 |
| AD—As above | do | 25.0 | 518.0 |
| CD—As above | do | 25.0 | 224.0 |
| CAD—As above | do | 37.5 | 664.0 |

Butyl alcohol was used to dissolve the compounds C and D (as in U.S. Pat. No. 2,412,510) and the resulting liquid was dispersed into Tween #20. The spray solutions showed a pH of between 5 and 7, which was adjusted to between 3 and 4 by adding 25 drops of hydrochloric acid to each spray solution. (See U.S. Pat. No. 2,412,510.)

Specifically, on Apr. 21, 14 pots of the tomatoes and dwarf peas (7 of each) were sprayed to drip-off, 1 pot of each being sprayed with 1 of the 7 experimental solutions. To test the effect of the rather heavy dose of Tween #20, 1 pot of both peas and tomatoes was sprayed to drip-off with a spray solution consisting of 37.5 cc. Tween #20 in 1 pint of water. To avoid contamination, separate sprayers were used for each spray, and after spraying, each spray group was isolated in wooden flats.

Within 4 hours of being sprayed, the plants sprayed with trifluralin showed a response such that their leaves had begun to curl parallel to the leaf axis in spray groups A, AC, AD and CAD. After 12 hours, all of the treated plants but A (spray groups C, D, AC, AD, CD and CAD) exhibited both leaf and stem distortion, while the plants treated with Tween #20 showed no such effects.

Table 8 shows the progressive effects of the sprays over the period 4/23/68 to 5/12/68, observed on alternate dates up through 5/5/68 with a final observation on 5/12/68. In taking these observations, the following rating scale was used:

0—No distortion
1—Slight distortion
2—Moderate distortion
3—Heavy distortion
4—Fatal The table shows a rather constant degree of moderate leaf distortion induced by trifluralin in Group A, which tapers off toward the end of observations. This phenomenon plus the early leaf curl effect noted above appear to indicate that compositions including trifluralin work with a time delay effect, the trifluralin first upsetting the plant's metabolism (in effect touching off an effort by the plant to throw off the trifluralin) in the midst of which metabolic defense action, either the trifluralin and/or compound C and/or compound D, at sublethal doses, strikes the disturbed plant with a growth impetus.

Further, Table 8 indicates synergic phenomena, in that in the earlier observations, for any given day, and especially in the peas, greater rates of distortion tend to occur as one moves from the individual compound spray groups to the composition spray groups. For example, on 4/25, leaf distortion in the peas is constant, at 2, for the individual compounds. The compositions' leaf distortion is not the additive product of the individual compounds involved, but is in every instance more severe than any of the distortion induced by an individual compound.

TABLE 8.—STEM AND LEAF EFFECTS OF EXPERIMENTAL SPRAYS UPON TINY TIM TOMATO AND DWARF PEA PLANTS 4/23/68 TO 5/12/68 (4/12/68 STOCK SOLUTIONS, AT RATE OF 100 cc./gal. OF SPRAY)

| Spray group | 4/23 Leaf | 4/23 Stem | 4/25 Leaf | 4/25 Stem | 4/27 Leaf | 4/27 Stem | 4/29 Leaf | 4/29 Stem | 5/1 Leaf | 5/1 Stem | 5/3 Leaf | 5/3 Stem | 5/5 Leaf | 5/5 Stem | 5/12 Leaf | 5/12 Stem |
|---|---|---|---|---|---|---|---|---|---|---|---|---|---|---|---|---|
| Tiny tims: | | | | | | | | | | | | | | | | |
| Group A | 2 | 0 | 2 | 0 | 2 | 0 | 2 | 0 | 2 | 0 | 0.5 | 0 | 0.5 | 0 | .25 | 0 |
| Group C | 2 | 2 | 2 | 2 | 3 | 2 | 3 | 2 | 3 | 3 | .3 | 3 | 3.5 | 3.5 | 3.5 | 3.5 |
| Group D | 2 | 2 | 2 | 2 | 2 | 2 | 3 | 2 | 3 | 2.5 | 3 | 3 | 3 | 3.5 | 3 | 3.5 |
| Group AC | 2 | 2 | 3 | 2 | 3 | 2.5 | 3.5 | 2.5 | 3 | 3 | 3.5 | 3 | 3 | 3.5 | 3.5 | 3.5 |
| Group AD | 2 | 2 | 3 | 2.5 | 3 | 2.5 | 3.5 | 2.5 | 3 | 3 | 3.5 | 3 | 3.5 | 3.5 | 3.5 | 3.5 |
| Group CD | 2 | 2 | 3 | 2.5 | 3 | 2.5 | 3.5 | 2.5 | 3 | 3 | 3.5 | 3 | 3.5 | 3.5 | 4 | 3.5 |
| Group CAD | 2.5 | 2 | 3 | 2.5 | 3 | 2.5 | 3 | 2 | 2 | 2 | 3 | 3 | 3 | 3.5 | 3 | 3.5 |
| Tween #20 | 1 | 0 | 2 | 0 | 2 | 0 | 2 | 0 | 2.5 | 0 | 2 | 0 | 2 | 0 | 1.5 | 0 |
| Control | 0 | 0 | 0 | 0 | 0 | 0 | 0 | 0 | 0 | 0 | 0 | 0 | 0 | 0 | 0 | 0 |
| Dwarf peas: | | | | | | | | | | | | | | | | 0 |
| Group A | 0 | 0 | 2 | 0 | 2 | 0 | 2 | 0 | 2 | 1.5 | 0 | 1 | 0 | 1 | 0 | |
| Group C | 2 | 1 | 2 | 2 | 2 | 2 | 2 | 2 | 2.5 | 2 | 2 | 2 | 2 | 2.5 | 3.5 | 3.5 |
| Group D | 2 | 1 | 2 | 2 | 2 | 2 | 2.5 | 1.5 | 3 | 3 | 2 | 2 | 2 | 2.5 | 3 | 3 |
| Group AC | 2 | 1 | 2.5 | 2.5 | 2.5 | 2.5 | 2.5 | 1.5 | 3 | 3 | 2.5 | 2.5 | 3 | 3 | 3.5 | 3.5 |
| Group AD | 2 | 1 | 2.5 | 2.5 | 2 | 2 | 2.5 | 2 | 3 | 3 | 2.5 | 2.5 | 3.5 | 3.5 | 3.5 | 3.5 |
| Group CD | 2 | 1 | 3 | 2 | .3 | 3 | 2.5 | 2 | 3 | 3 | 2.5 | 2.5 | 3.5 | 3.5 | 3.5 | 3.5 |
| Group CAD | 2.5 | 2.5 | 2.5 | 2.5 | 3 | 3 | 2 | 2 | 3 | 3 | 2.5 | 2.5 | 3 | 3 | 2 | 3 |
| Tween #20 | 1.5 | 1.5 | 2 | 0 | 2 | 0 | 2 | 0 | 1.5 | 0 | 1.5 | 0 | 2 | 0 | 2 | 0 |
| Control | 0 | 0 | 0 | 0 | 0 | 0 | 0 | 0 | 0 | 0 | 0 | 0 | 0 | 0 | 0 | 0 |

Another indication of synergy is that, over time, the compositions tend to affect the plants more severely before the individual compounds do despite the tapering off effect of the trifluralin over time. Thus synergy is demonstrated in two frames of reference, the first being comparable severity of effect on a given date, the second being earlier impact.

Table 8 also shows that the amount of Tween #20 used is capable of affecting the plants' performance, probably by inhibiting respiration. This means that it played an active role in interferring with the plants' growth, but does not impair the validity of the comparisons made, because it was common to all plants. Since such a heavy rate of Tween #20 does affect the plants, stock solutions of the present example were used (identified as the 4/12/68 stock solutions) only for the weakest of spray solutions in subsequent experiments. Also a new set of stock solutions were prepared, eight times stronger than the 4/12/68 solution, so as to minimize the quantity of Tween #20 in the intermediate and strong spray solutions of subsequent experiments. In subsequent experiments, then, the present experiments' stock solutions will be identified as 4/12/68, and the stronger solutions, as the 5/20/68 stock solutions.

EXAMPLE 5

This example also deals with herbaceous plants, i.e., Tiny Tim tomatoes, dwarf peas, and radishes. In this example and the subsequent two (Examples 6 and 7) herbaceous plants were sprayed to drip-off with experimental spray solutions, made up from stock solutions that are individually described in each example.

In this example, the stock solutions used were those described in Example 4, referred to as the 4/12/68 stock solutions. Seven spray solutions were made up at a rate of 0.8 cc. of stock solution per gallon of tap water, by adding 0.1 cc. of the stock solution into 473 cc. (one pint) of tap water, and using an adequate amount of hydrochloric acid to adjust the pH of the spray solutions to between 3 and 4. The following spray solutions were obtained:

| Spray solution | Active ingredient in stock solution by weight, percent | Cc. of stock solution per pint | Approximate active ingredient p.p.m. in spray solution, rounded off to two decimal places |
|---|---|---|---|
| A | 1.48 | 0.1 | 3.52 |
| C | 0.50 percent | 0.1 | 1.16 |
| D | 0.25 percent | 0.1 | 0.63 |
| AC | As above | 0.2 | 4.68 |
| AD | do | 0.2 | 4.15 |
| CD | do | 0.2 | 1.79 |
| CAD | do | 0.3 | 5.31 |

An 800 square foot garden plot was prepared on June 6 and 7th, using a roto tiller to a depth of seven or eight inches, working in two tons of sand, three six cubic foot bales of peat moss, and lime and fertilizer after a soil test. Also, a small part of the plot was dug with a spade to a depth of 12 inches, working in additional sand and peat moss, to provide a proper bed for the radishes.

The tomatoes, peas and radishes had been seeded in 3 inch peat pots (3 seeds to the pot) on 4/18, 4/20 and 6/1/68 respectively, so that they would all reach an approximately equivalent condition of growth by June 4. Persistent rain in late May and early June prevent soil preparation until the ground had sufficiently dried on June 6. Because of this, spraying was delayed beyond the June 4 target date, but none of the plants at the time of spraying had yet developed buds and flowers.

Taking 3 pots of each type of plant on June 9, being careful that each such pot indeed contained 3 plants, the pots were labeled in indelible ink on wooden labels inserted in each pot, appropriately identifying the pots as to what spray was used, and then all 9 plants of each type of plant were sprayed to drip-off with its appropriate spray solution.

The radishes were immediately planted on June 9 in their bed. On June 10, the peas and tomatoes which had been sprayed, were planted as were their respective control plants. After the plants had well taken root in the soil, they were thinned, leaving only one plant per peat pot planted, except for the radishes.

The sprays proved too strong for the pea vines, which all died.

Upon maturing, and being harvested, only one spray group AD, exceeded the control group in gram weight of crop yield. They were harvested on June 27, and the results are summarized in Table 9.

TABLE 9

| Spray solution (.8 cc./gal.) | Gram weight of entire plant | Gram weight of radishes | Gram weight of stems and leaves |
|---|---|---|---|
| A | 61.0 | 15 | 46 |
| C | 71 | 20 | 51 |
| D | 42 | 9 | 33 |
| AC | 61 | 16 | 45 |
| AD | 99 | 39 | 60 |
| CD | 71 | 15.0 | 56 |
| CAD | 100 | 40 | 70 |
| Control | 90 | 35 | 55 |

It is worth noting that 3 spray groups exceeded the control in production of stems and leaves, for although these are not a crop, they are part of an herbaceous plant.

Once the tomatoes began ripening, they were picked as often as seemed necessary, counting, weighing and measuring their size range for each harvest. Tables 10, 11 and 12 present that data.

TABLE 10.—SIZE RANGE PER SPRAY GROUP, OVER ENTIRE HARVEST PERIOD, PLANTS SPRAYED AT A RATE OF 0.8 CC. OF RESPECTIVE 4/12/68 STOCK SOLUTION PER GALLON, THREE PLANTS (T. T. TOMATOES) PER SPRAY GROUP

| Spray group | Size range | Range spread |
|---|---|---|
| A | 7/16–15/16 | 15/16. |
| C | 9/16–19/16 | 1½. |
| D | 9/16–19/16 | 1 no/16. |
| AC | 8/16–19/16 | 1 no/16. |
| AD | 9/16–17/16 | 15/16. |
| CD | 8/16–19/16 | 1½. |
| CAD | 7/16–17/16 | 1 no/16. |
| Control | 7/16–19/16 | 15/16. |

While 4 spray groups exhibited a larger upper measure over the control range upper measure, only 1 (Group C) is a sizable increase over control. In like manner, the range spread is quite consistent, except for Group C, indicating that any significant divergence in gram weight per spray group over Control group gram weight is principally attributable to increased number of fruit, rather than size.

The gram weight of the harvest of fruit by spray group is presented in Table 11, by each harvest date and by total harvest weight, indexed to the Control Group.

TABLE 11.—GRAM WEIGHT OF EACH EXPERIMENTAL SPRAY GROUP HARVEST OF RIPE FRUIT (TINY TIM TOMATOES, SPRAYED ONCE AT RATE OF 0.8 cc./gal. OF RESPECTIVE STOCK SOLUTION) ON EACH HARVEST DATE, INDEXED TO CONTROL GROUP HARVEST, AND TOTAL HARVEST GRAM WEIGHT PER GROUP, INDEXED TO CONTROL, SUMMER OF 1968

| Spray group | 7/18 Gram wt. | 7/18 Index | 7/22 Gram wt. | 7/22 Index | 7/28 Gram wt. | 7/28 Index | 8/1 Gram wt. | 8/1 Index | 8/9 Gram wt. | 8/9 Index | 8/13 Gram wt. | 8/13 Index |
|---|---|---|---|---|---|---|---|---|---|---|---|---|
| A | | | 58 | 1.32 | 62 | 0.95 | 28 | 0.33 | 190 | 0.95 | 42 | 1.62 |
| C | 15 | 0.79 | 282 | 6.41 | 49 | 0.75 | | | 20 | 0.10 | 29 | 1.12 |
| D | | | | | 18 | 0.28 | 39 | 0.45 | 190 | 0.95 | 85 | 3.27 |
| AC | | | 88 | 2.00 | 3 | 0.05 | | | 32 | 0.16 | | |
| AD | | | 70 | 1.59 | 122 | 1.88 | 26 | 0.30 | 4.02 | 2.01 | 440 | 16.92 |
| CD | 72 | 3.79 | 150 | 3.41 | 79 | 1.22 | | | 45 | 0.23 | 20 | 0.77 |
| CA | 72 | 3.79 | 78 | 1.77 | 40 | 0.62 | 10 | 0.12 | 50 | 0.25 | | |
| Control | 19 | 1.00 | 44 | 1.00 | 65 | 1.00 | 86 | 1.00 | 200 | 1.00 | 26 | 1.00 |

| Spray group | 8/19 Gram wt. | 8/19 Index | 8/26 Gram wt. | 8/26 Index | 9/2 Gram wt. | 9/2 Index | 9/9 Gram wt. | 9/9 Index | 9/16 Gram wt. | 9/16 Index | 9/22 Gram wt. | 9/22 Index |
|---|---|---|---|---|---|---|---|---|---|---|---|---|
| A | 52 | 0.16 | 355 | 0.46 | 85 | 0.53 | 142 | 2.78 | 89 | 17.80 | 70 | 1.75 |
| C | 145 | 0.45 | 230 | 0.30 | 262 | 1.64 | 50 | 0.98 | 50 | 10.00 | 58 | 1.45 |
| D | 422 | 1.30 | 1,088 | 1.40 | 310 | 1.94 | 158 | 3.10 | 160 | 32.00 | 111 | 2.78 |
| AC | 100 | 0.31 | 308 | 0.40 | 132 | 0.83 | 41 | 0.80 | 51 | 10.20 | 60 | 1.50 |
| AD | 825 | 2.54 | 1,130 | 1.45 | 200 | 1.25 | 190 | 3.73 | 190 | 38.00 | 119 | 2.98 |
| CD | 45 | 0.14 | 405 | 0.52 | 220 | 1.38 | 61 | 1.20 | 180 | 36.00 | 21 | 0.53 |
| CAD | 50 | 0.15 | 295 | 0.38 | 5 | 0.03 | 89 | 1.75 | 80 | 16.00 | 72 | 1.80 |
| Control | 325 | 1.00 | 799 | 1.00 | 160 | 1.00 | 51 | 1.00 | 5 | 1.00 | 40 | 1.00 |

| Spray group | 9/30 Gram wt. | 9/30 Index | 10/7 Gram wt. | 10/7 Index | 10/13 Gram wt. | 10/13 Index | 10/26 Gram wt. | 10/26 Index | Total Gram wt. | Total Index |
|---|---|---|---|---|---|---|---|---|---|---|
| A | 630 | 2.36 | 311 | 2.73 | 169 | 1.58 | 335 | 1.25 | 2,598 | 1.02 |
| C | 252 | 0.94 | 142 | 1.25 | 150 | 1.40 | 342 | 1.27 | 2,076 | 0.81 |
| D | 545 | 2.04 | 288 | 2.53 | 161 | 1.50 | 268 | 1.00 | 3,844 | 1.50 |
| AC | 820 | 3.07 | 455 | 3.99 | 320 | 2.99 | 890 | 3.31 | 3,300 | 1.29 |
| AD | 420 | 1.57 | 280 | 2.46 | 155 | 1.45 | 388 | 1.44 | 4,957 | 1.94 |
| CD | 320 | 1.20 | 272 | 2.39 | 121 | 1.13 | 422 | 1.57 | 2,433 | 0.95 |
| CAD | 975 | 3.65 | 491 | 4.31 | 490 | 4.58 | 565 | 2.10 | 3,362 | 1.31 |
| Control | 267 | 1.00 | 144 | 1.00 | 107 | 1.00 | 269 | 1.00 | 2,557 | 1.00 |

It is to be noted that over all in Table 11, 5 of the spray groups outproduce control in gram weight of crop harvested, 4 of those groups (D, AC, AD and CAD) by substantial margins. It is even more instructive to note the effect of the sprays upon the timing of the ripe fruit weight cycle, for it in turn reflects the budding, flowering and fruiting cycles.

The Control Group has waxing and waning cycles reaching peak gram weight on 8/9, 8/26, 9/30 and 10/26/68. Plants sprayed with compound A peak on the same dates, with an additional peak on 9/9/68, but gram yield is consistently less than control until, first 9/16 (not a peak date) and until the Control peak date of 9/30/68. The net effect is an extra peak date and a temporal delay in heaviest ripe fruiting, with a modest excess of control over all.

Plants sprayed with compound C (2,4-D) exhibit a peak on 7/22/68, but then do not peak again until 9/2/68, after two control peaks have passed. Thereafter these plants peak with the control. The net effect is an early and considerable peak in gram weight, almost 6 and ½ times the control yield on 8/26, followed by gram weight peaks almost perfectly aligned with the control groups' (except for 8/26) but total yield is less than the control yield. That relative retardation is probably attributable to the strength of compound C in the spray solution. It is quite likely that a weaker dose of compound C would not have that relatively retarditive effect.

Plants sprayed with compound D (2,4,5-T) exhibit peaks on the very same dates as the control, lagging slightly in gram weight on the first and last control peaks, but exceeding control by considerable margins on the two intermediate peak dates. The net result is a narrowing of the time span within which major fruiting occurs by weight.

Plants treated with composition AC peak on 7/22, then slump past the first control peak on 8/9. Thereafter, these plants peak with the control plants, weakly on 8/26 but very strongly exceeding control on 9/30 and 10/26, the net effect being a slight early spurt in crop yield, followed by a temporal lag in ripe fruiting but a considerable increase (20%) in overall crop yield by weight.

Plants treated with composition AD peak first on 7/28 instead of on 8/9, do not peak on 8/9 (although significantly outproducing control on that date) and then proceed to peak with the control group thereafter. The net effect is an early spurt in crop weight, followed by a relative temporal lag until 8/26 from which time the AD plants consistently out-produce the controls on peak dates (94% increase overall).

Plants treated with composition CAD exhibit an early peak on 7/22, followed by a relative slump until peaking (weakly vis a vis control) on 8/26 and continuing to peak with control thereafter. The net effect is an early peak, followed by a compression of ripe fruiting between 9/30 and 10/26, at which peaks gram yield is remarkably in excess of control (31% increase overall).

An almost identical set of patterns in regard to cyclic behavior of ripe fruiting, by number of ripe fruit, is found in Table 12.

TABLE 12.—NUMBER OF RIPE FRUIT HARVESTED EACH HARVEST DATE, FROM TINY TIM TOMATOES SPRAYED AT RATE OF 0.8 cc./gal. OF RESPECTIVE STOCK SOLUTIONS, INDEXED TO CONTROL GROUP HARVEST, AND TOTAL HARVEST NUMBER OF FRUIT PER SPRAY GROUP INDEXED TO TOTAL CONTROL, SUMMER OF 1968

| Spray group | 7/18 No. of fruit | 7/18 Index | 7/22 No. of fruit | 7/22 Index | 7/28 No. of fruit | 7/28 Index | 8/1 No. of fruit | 8/1 Index | 8/9 No. of fruit | 8/9 Index | 8/13 No. of fruit | 8/13 Index |
|---|---|---|---|---|---|---|---|---|---|---|---|---|
| A | | | 5 | 0.83 | 9 | 0.82 | 3 | 0.25 | 16 | 0.59 | 4 | 0.57 |
| C | 1 | 0.50 | 25 | 4.17 | 6 | 0.55 | | | 2 | 0.07 | 3 | 0.43 |
| D | | | | | 22 | 2.00 | 5 | 0.42 | 22 | 0.81 | 12 | 1.71 |
| AC | | | 9 | 1.50 | 1 | 0.09 | | | 4 | 0.15 | | |
| AD | | | 7 | 1.17 | 15 | 1.36 | 5 | 0.42 | 39 | 1.44 | 56 | 8.00 |
| CD | 6 | 3.00 | 17 | 2.83 | 12 | 1.09 | | | 5 | 0.19 | 3 | 0.43 |
| CAD | 5 | 2.50 | 8 | 1.33 | 5 | 0.45 | 3 | 0.25 | 7 | 0.26 | | |
| Control | 2 | 1.00 | 6 | 1.00 | 11 | 1.00 | 12 | 1.00 | 27 | 1.00 | 7 | 1.00 |

TABLE 12.—Continued

| Spray group | 8/19 | | 8/26 | | 9/2 | | 9/9 | | 9/16 | | 9/22 | |
|---|---|---|---|---|---|---|---|---|---|---|---|---|
| | No. of Fruit | Index | No. of fruit | Index | No. of fruit | Index | No. of fruit | Index | No. of fruit | Index | No. of fruit | Index |
| A | 5 | 0.17 | 34 | 0.43 | 12 | 0.57 | 18 | 2.57 | 11 | 11.00 | 10 | 1.43 |
| C | 13 | 0.45 | 27 | 0.34 | 28 | 1.33 | 7 | 1.00 | 7 | 7.00 | 8 | 1.14 |
| D | 55 | 1.90 | 107 | 1.35 | 42 | 2.00 | 21 | 3.00 | 18 | 18.00 | 19 | 2.71 |
| AC | 8 | 0.28 | 28 | 0.35 | 17 | 0.81 | 4 | 0.57 | 8 | 8.00 | 11 | 1.57 |
| AD | 80 | 2.76 | 108 | 1.37 | 27 | 1.29 | 21 | 3.00 | 21 | 21.00 | 21 | 3.00 |
| CD | 5 | 0.17 | 41 | 0.52 | 25 | 1.19 | 6 | 0.86 | 15 | 15.00 | 3 | 0.43 |
| CAD | 4 | 0.14 | 26 | 0.33 | 1 | 0.05 | 8 | 1.14 | 9 | 9.00 | 11 | 1.57 |
| Control | 29 | 1.00 | 79 | 1.00 | 21 | 1.00 | 7 | 1.00 | 1 | 1.00 | 7 | 1.00 |

| Spray group | 9/30 | | 10/7 | | 10/13 | | 10/26 | | Total | |
|---|---|---|---|---|---|---|---|---|---|---|
| | No. of fruit | Index | No. of fruit | Index | No. of fruit | Index | No. of fruit | Index | No. of fruit | Index |
| A | 76 | 2.81 | 43 | 2.87 | 27 | 2.25 | 52 | 1.93 | 235 | 1.12 |
| C | 24 | 0.89 | 18 | 1.20 | 21 | 1.75 | 39 | 1.44 | 229 | 0.79 |
| D | 65 | 2.41 | 40 | 2.67 | 24 | 2.00 | 33 | 1.22 | 485 | 1.67 |
| AC | 73 | 2.70 | 45 | 3.00 | 35 | 2.95 | 83 | 3.07 | 328 | 1.13 |
| AD | 44 | 1.63 | 30 | 2.00 | 20 | 1.67 | 47 | 1.74 | 541 | 1.87 |
| CD | 36 | 1.33 | 27 | 1.80 | 11 | 0.92 | 46 | 1.70 | 258 | 0.98 |
| CAD | 82 | 3.04 | 46 | 3.07 | 41 | 3.42 | 62 | 2.30 | 318 | 1.10 |
| Control | 27 | 1.00 | 15 | 1.00 | 12 | 1.00 | 27 | 1.00 | 29 | 1.00 |

Suppose that the major peak of the control group's gram weight yield is taken as a base point, and the yield before and after base point is calculated. The results appear in Table 13.

TABLE 13

| Spray group | Before | Index of control (rounded) | After | Index of control (rounded) |
|---|---|---|---|---|
| A | 432 | 0.66 | 1,813 | 1.79 |
| C | 540 | 0.71 | 1,306 | 1.29 |
| D | 754 | 0.99 | 2,001 | 1.98 |
| AC | 223 | 0.29 | 2,769 | 2.73 |
| AD | 1,885 | 2.46 | 1,942 | 1.92 |
| CD | 411 | 0.54 | 1,617 | 1.60 |
| CAD | 300 | 0.39 | 2,767 | 2.73 |
| Control | 765 | 1.00 | 1,013 | 1.00 |

Thus it appears that relatively great crop yield prior to the control groups' major bearing peak can be induced with only one composition, but that every composition will induce greater crop yield, after the control's major bearing peak, than will the control group.

Crops mature over a span of time. If one takes the central time period of control peak crop bearing, adding a week at either end for good measure, one can construct Table 14 below from Table 11.

TABLE 14.—GRAM YIELD OF TINY TIM TOMATOES, HARVESTED BETWEEN 8/19 AND 10/7/68, PEAK YIELD PERIOD INDEXED TO CONTROL, COMPARED TO INDEX OF TABLE 11

Data Taken From Table 11

| Spray group | Yield | Yield indexed to period control (rounded) | Total index from Table 11 (rounded) |
|---|---|---|---|
| A | 1,734 | 1.00 | 1.02 |
| C | 1,189 | 0.68 | 0.81 |
| D | 3,082 | 1.77 | 1.50 |
| AC | 1,967 | 1.13 | 1.29 |
| AD | 3,354 | 1.93 | 1.94 |
| CD | 1,524 | 0.87 | 0.95 |
| CAD | 2,057 | 1.18 | 1.32 |
| Control | 1,741 | 1.00 | 1.00 |

Table 14 shows that every experimental spray group bears the bulk of its yield in the central time period of the control plants' yields. It further shows that one compound and three compositions (D, AC, AD and CAD) have the effect of intensifying crop yield in that span of time to a greater degree than the control yields in that span of time.

Therefore, in light of Tables 13 and 14, it can be said that certain of these compounds and compositions can be used not only to increase the number of and total weight of fruit, but can also be used to advantageously adjust the timing of major fruiting induced by the experimental sprays.

The data of Tables 11, 12 and 14 demonstrate that the chief impetus to increased crop weight is not so much increase in the size of individual fruit, but principally in the increased number of relatively normal sized fruit. The positive synergy demonstrated by the data is as follows:

TABLE 11–A

Synergy indicated by comparison of differences in percentage differences of gram weight induced by compounds, indexed to control weight and percentage differences of gram weight induced by compositions indexed to control weight (percentages derived from total column in Table 11)

By compounds, percent:     By compositions, percent
A and C=—17 _____ AC=29
A and D=52 _____ AD=94

TABLE 12–A

Synergy indicated by comparison of differences in percentage differences of number of ripe fruit induced by compounds, indexed to control number, and percentage differences of number of ripe fruit induced by compositions, indexed to control number (percentages derived from total column in Table 12)

By compound, percent:     By compositions, percent
A and C=—9 _____ AC=13
A and D=79 _____ AD=87

TABLE 14–A

Positive synergy indicated by comparison of percentage differences in peak yields induced by compounds, indexed to peak yield period control, and peak yields induced by compositions, indexed to peak yield period control (percentages derived from yield index to period control column, Table 14)

By compounds, percent:     By composition, percent
A and C=—32 _____ AC=13
A and D=77 _____ AD=93

Turning to Table 11–A, it will be seen that the compositions exceed additive gram yield of the irrespective compounds. Therefore, Table 11–A exhibits a positive synergic relation between the compounds in composition. Moreover, compositions AC and AD outproduce the control, particularly composition AD, with a 94% increase in gram weight. From Table 11 it will also be seen that composition CAD also outproduces the control.

From Table 12–A it will be seen that positive synergy is exhibited because percentage number of fruit of the compositions exceeds the additive percentage differences from the control of their respective compounds.

It should be noted that compositions AC and AD outproduce the control, particularly composition AD with 87% gain. From Table 12 it will also be seen that composition CAD also outproduces the control.

Similarly Table 14–A demonstrates positive synergy of compositions AC and AD. Moreover these and the other composition CAD outproduce the control.

It should be mentioned that while the major concern in this experiment was crop yield, the stem thickening effect detailed in Example 2 was also observed. The more heavily bearing plants were also invariably possessed of thicker than normal stems and lusher leaves than the less heavily bearing plants. The leaves of the control plant were relatively thin and paperish, without much spring to them, while the leaves of the plants treated with compound D and compositions AC, AD and CAD were almost invariably thicker, springier to the touch and more profuse than the control plants' leaves.

EXAMPLE 6

The work of this example was done at the same time as was the work of Example 5. Everything described in Example 5 as to preparation and execution is identical herein except that stronger stock solutions (of 5/20/68) were used, and so also were stronger spray solutions. As mentioned earlier, the stronger stock solutions reduce the amount of Tween #20 in the spray solutions to a level that would be effective in emulsifying, but would not heavily coat the leaves.

The concentration of the trifluralin in the sprays used herein was about 4 times its concentration in the earlier (4/12/68) stock solutions. Again, an amount of butyl alcohol sufficient to dissolve the 2,4–D and 2,4,5–T compounds was used.

The new (5/20/68) stock solutions comprised the following:

|   | Percentage of active ingredient by weight | Cc. stock solution per pint (approximate) | Approximate p.p.m. active ingredient in spray solution |
| --- | --- | --- | --- |
| A—Trifluralin | 5.25 | .3125 | 35.89 |
| C—2, 4—D | 7.82 | .3125 | 54.11 |
| D—2, 4, 5—T | 4.00 | .3125 | 27.22 |
| AC— As above | 13.07 | .625 | 89.99 |
| AD— As above | .925 | .625 | 63.10 |
| CD— As above | 11.82 | .625 | 81.33 |
| CAD— As above | 17.07 | .9375 | 117.21 |

In preparing these spray solution, a 1.0 cc. graduated syringe was used to add the stock solutions into the water, using the stock solutions at a rate of 2.5 cc. per gallon and using one syringe for each of the three stock solutions to avoid contamination. Also, it was found that 10 drops of hydrochloric acid was required to adjust the pH of the spray solutions to between 3 and 4.

The tomato, pea and radish plants were sprayed to drip-off on June 9th, as described in Example 5. The radishes were planted on the same date, but the peas and tomatoes were planted on June 10. After the plants had had time to take root after transplanting, they were thinned so that only 3 tomato and pea plants remained in each experimental spray group. All of the peas looked poor on the day of thinning (June 19, 1968).

The sprays proved too strong for the peas and radishes, for the peas died and the radishes were deformed. Once the tomatoes began ripening, they were picked as often as seemed necessary and examined.

It was observed that a relatively strong dosage of trifluralin can retard crop bearing through time, even though exceeding control in the final analysis, without however, doing any other significant damage to the plant. In fact, those particular plants so treated flourished in physical size, being at least as tall as any of the plants in either Example 5 or 6, and taller than most, as well as being exceedingly lush and full in development. Thus, trifluralin promotes herbaceous growth.

It was also observed that these sprays have an effect on the timing of the ripe fruit gram weight cycle. As seen earlier, the control group (which is common to both Example 5 and 6) shows a waxing/waning cycle reaching peaks of gram weight on 8/9/68, 8/26/68, 9/30/68 and 10/26/68.

Plants treated with trifluralin peaked at 9/9/68, 9/30/68 and 10/26/68, showing a considerable retardation in initial peak, but showing an increase in total overall yield.

Thus, at the higher concentration in this example, trifluralin itself stimulated the growth of the tomato plants while the other compounds acted essentially as herbicides.

It is evident from the foregoing examples that the herbicides trifluralin and cacodylic acid or their salts in sublethal dosage, alone or in combination stimulate the growth of herbaceous and woody stemmed plants and that each or both of these herbicidal compounds when combined with the herbicides 2,4-dichlorophenoxyacetic acid or its salts and/or 2,4,5-trichlorophenoxyacetic acid or its salts, in sublethal dosage, also stimulates such growth, several of the compositions combining the herbicides also exhibiting positive synergism. Such compounds and compositions also increase overall crop yields and some favorably effect fruiting time. It is to be noted that in each of the examples set forth hereinbefore, the plants were sprayed only once with the solutions of the compounds and compositions.

While preferred embodiments of the invention are here described, it will be understood that skilled artisans may make variations without departing from the spirit of the invention.

I claim:

1. A method of stimulating the growth of herbaceous and woody stemmed plants comprising applying directly thereto N,N - di-n-propyl-4-trifluoromethyl-2,6-dinitroaniline or cacodylic acid or the salts thereof in a concentration and amount sufficient to effect growth stimulation.

2. The method of claim 1 wherein the N,N-di-n-propyl-4-trifluoromethyl-2,6-dinitroaniline is applied to drip off as an aqueous solution containing about 3.5–35.9 p.p.m. of the compound.

3. The method of claim 1 wherein the second-named compound is sodium cacodylate.

4. The method of claim 1 wherein the second-named compound is the disodium salt of cacodylic acid.

5. The method of claim 1 wherein both the first-named and the second-named compounds are applied together to the woody stemmed plant in a concentration and amount sufficient to effect growth stimulation.

6. The method of claim 1 in which the first-named or second-named compounds are applied to the plant together with 2,4-dichlorophenoxyacetic acid or 2,4,5-trichlorophenoxyacetic acid or the salts thereof in a concentration and amount sufficient to effect growth stimulation.

7. The method of claim 6 wherein the N,N-di-n-propyl-4-trifluoromethyl-2,6-dinitroaniline is applied together with the sodium salt of 2,4-dichlorophenoxyacetic acid to the plant in a concentration and amount sufficient to effect growth stimulation.

8. The method of claim 7 wherein the compounds are applied to drip off as an aqueous solution containing about 3.5–35.9 p.p.m. N,N-di-n-propyl-4-trifluoromethyl-2,6-dinitroaniline and 1.2–15.0 p.p.m. sodium salt of 2,4-dichlorophenoxyacetic acid.

9. The method of claim 8 wherein the N,N-di-n-propyl-4-trifluoromethyl-2,6-dinitroaniline is applied together with the sodium salt of 2,4,5-trichlorophenoxyacetic acid to the plant in a concentration and amount sufficient to effect growth stimulation.

10. The method of claim 9 wherein the compounds are applied to drip off as an aqueous solution containing about 3.5–35.9 p.p.m. N,N-di-n-propyl-4-trifluoromethyl-2,6-dinitroaniline and 0.6–7.0 p.p.m. sodium salt of 2,4,5-trichlorophenoxyacetic acid.

11. The method of claim 8 wherein the second-named compound is the sodium or disodium salt of cacodylic acid and is applied to woody stemmed plants together with the sodium salt of 2,4,5-trichlorophenoxyacetic acid in a concentration and amount sufficient to effect growth stimulation.

12. The method of claim 8 wherein the N,N-di-n-propyl-4-trifluoromethyl-2,6-dinitroaniline is applied to the plant together with the sodium or disodium salt of cacodylic acid and the sodium salt of 2,4-dichlorophenoxyacetic acid in a concentration and amount sufficient to effect growth stimulation.

13. The method of claim 12 wherein the compounds are applied to drip off as an aqueous solution containing about 20.0 p.p.m. N,N-di-n-propyl-4-trifluoromethyl-2,6-dinitroaniline, about 61.0 p.p.m. sodium cacodylate and about 15.0 p.p.m. sodium salt of 2,4-dichlorophenoxyacetic acid.

14. The method of claim 8 wherein the N,N-di-n-propyl-4-trifluoromethyl-2,6-dinitroaniline is applied to the plant together with the sodium or disodium salt of cacodylic acid and the sodium salt of 2,4,5-trichlorophenoxyacetic acid in a concentration and amount sufficient to effect growth stimulation.

15. The method of claim 14 wherein the compounds are applied to drip off as an aqueous solution containing about 20.0 p.p.m. N,N-di-n-propyl-4-trifluoromethyl-2,6-dinitroaniline, about 61.0 p.p.m. sodium cacodylate and about 7.0 p.p.m. sodium salt of 2,4,5-trichlorophenoxyacetic acid.

16. The method of claim 8 wherein the sodium or disodium salt of cacodylic acid is applied to woody stemmed plants together with the sodium salts of 2,4-dichlorophenoxyacetic acid and trichlorophenoxyacetic acid in a concentration and amount sufficient to effect growth stimulation.

17. The method of claim 8 wherein the N,N-di-n-propyl-4-trifluoromethyl-2,6-dinitroaniline is applied to the plant together with the sodium salts of 2,4-dichlorophenoxyacetic acid and trichlorophenoxyacetic acid in a concentration and amount sufficient to effect growth stimulation.

18. The method of claim 17 wherein the compounds are applied to drip off as an aqueous solution containing about 3.5–35.9 p.p.m. N,N-di-n-propyl-4-trifluoromethyl-2,6-dinitroaniline, about 1.2–15.0 p.p.m. sodium salt of 2,4-dichlorophenoxyacetic acid and about 0.6–7.0 p.p.m. sodium salt of 2,4,5-trichlorophenoxyacetic acid.

19. The method of claim 8 wherein the second-named compound is the sodium or disodium salt of cacodylic acid.

20. A method of increasing the overall weight yield of fruits of herbaceous plants comprising applying to the leaves and stems thereof to drip off prior to bud formation an aqueous solution containing about 3.5 p.p.m. N,N-di-n-propyl-4-trifluoromethyl-2,6-dinitroaniline and about 1.2 p.p.m. sodium salt of 2,4-dichlorophenoxyacetic acid.

21. A method of increasing the overall weight yield of fruits of herbaceous plants comprising applying to the leaves and stems thereof to drip off prior to bud formation an aqueous solution containing about 3.5 p.p.m. N,N-di-n-propyl-4-trifluoromethyl-2,6-dinitroaniline and about 0.6 p.p.m. sodium salt of 2,4,5-trichlorophenoxyacetic acid.

22. A method of increasing the overall weight yield of fruits of herbaceous plants comprising applying to the leaves and stems thereof to drip off prior to bud formation an aqueous solution containing about 3.5 p.p.m. N,N-di-n-propyl-4-trifluoromethyl-2,6-dinitroaniline, about 1.2 p.p.m. sodium salt of 2,4-dichlorophenoxyacetic acid and about 0.6 p.p.m. sodium salt of 2,4,5-trichlorophenoxyacetic acid.

References Cited
UNITED STATES PATENTS 2,390,941  12/1945  Jones _____ 71—117
3,257,190  6/1966   Soper _____ 71—121

JAMES O. THOMAS, Jr., Primary Examiner

U.S. Cl. X.R.

71—116, 117, 121